(12) United States Patent
Simske et al.

(10) Patent No.: US 8,593,688 B2
(45) Date of Patent: Nov. 26, 2013

(54) METHOD FOR ENHANCING SECURITY PRINTING

(75) Inventors: Steven J. Simske, Fort Collins, CO (US); Juan C. Villa, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 13/125,269

(22) PCT Filed: Oct. 20, 2008

(86) PCT No.: PCT/US2008/080538
§ 371 (c)(1),
(2), (4) Date: Apr. 20, 2011

(87) PCT Pub. No.: WO2010/047687
PCT Pub. Date: Apr. 29, 2010

(65) Prior Publication Data
US 2011/0261376 A1    Oct. 27, 2011

(51) Int. Cl.
*G06F 3/12* (2006.01)
*G06K 15/02* (2006.01)

(52) U.S. Cl.
USPC ............................ 358/1.9; 358/1.18; 358/1.15

(58) Field of Classification Search
USPC ................. 358/1.9, 3.24, 1.15, 1.18; 380/255
See application file for complete search history.

(56) References Cited

U.S. PATENT DOCUMENTS

| | | | |
|---|---|---|---|
| 5,912,972 A | 6/1999 | Barton | |
| 6,311,214 B1 | 10/2001 | Rhoads | |
| 6,456,726 B1 | 9/2002 | Yu et al. | |
| 6,961,441 B1 | 11/2005 | Hershey et al. | |
| 7,538,910 B2 * | 5/2009 | Czudak et al. | 358/3.24 |
| 2003/0004946 A1 | 1/2003 | Vandenavond et al. | |
| 2003/0021443 A1 | 1/2003 | Haitsma et al. | |
| 2003/0149879 A1 | 8/2003 | Tian | |
| 2004/0008866 A1 | 1/2004 | Rhoads et al. | |
| 2004/0044894 A1 | 3/2004 | Lofgren et al. | |
| 2006/0132825 A1 | 6/2006 | Czudak | |
| 2007/0182985 A1 * | 8/2007 | Ciriza et al. | 358/1.15 |
| 2008/0199040 A1 | 8/2008 | Jonsson et al. | |
| 2008/0232640 A1 | 9/2008 | Ishizu | |

FOREIGN PATENT DOCUMENTS

| | | |
|---|---|---|
| CN | 1969284 A | 5/2007 |
| CN | 101277360 A | 10/2008 |
| EP | 0982930 | 3/2000 |
| EP | 1953752 | 8/2008 |
| KR | 1020060016850 A | 2/2006 |
| KR | 1020070064952 A | 6/2007 |
| WO | 2005088517 A1 | 9/2005 |
| WO | WO-2007/003008 | 1/2007 |
| WO | WO 2007/003008 | 1/2007 |

OTHER PUBLICATIONS

PCT/US2008/080538; Interntinal Search Report and the Written Opinion; Mailing Date: Jun. 23, 2009.

* cited by examiner

*Primary Examiner* — Charlotte M Baker

(57) ABSTRACT

A method for enhancing security printing includes determining fields associated with print job variability. Physical security information is entered, and a physical security data stream is generated from the physical security information. The physical security data stream is mapped to a data stream that is used to provide settings for the fields for the print job variability. The fields for the print job variability are set based upon the mapping the physical security data stream.

14 Claims, 2 Drawing Sheets

METHOD FOR ENHANCING SECURITY PRINTING

BACKGROUND

The present disclosure relates generally to a method for enhancing security printing.

Product labeling and security packaging are important components of brand protection, product tracking and authenticating, as well as of anti-counterfeiting initiatives. Such labels/packages must be authorized (i.e., access to them should be privileged), authenticable (e.g., containing encoded/encrypted information that can be decoded/decrypted for security purposes), and unique (i.e., differentiable from any other printed material). In an effort to create such labels/packages, a unique ID, in the form of, for example, a deterrent or mark may be added. Furthermore, measures are often taken to enhance the probability that the product cannot be counterfeited, for example, by making the packaging or labels difficult and/or time consuming to replicate and/or by using variable data printing (VDP). Variable data printing has changed the expectations in industrial and commercial printing, affording customization and specialization of printing.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiments of the method(s) disclosed herein advantageously map physical security information to variable settings for a print job. As such, strategy information for the overall print job (e.g., linking of deterrents, scrambling algorithms, etc.) is directly determined by fields of the corresponding physical security involved in the print job. It is believed that such mapping adds a level of complexity to the registry for the security printing, thus making reverse engineering of the print job more difficult.

Figure 1:
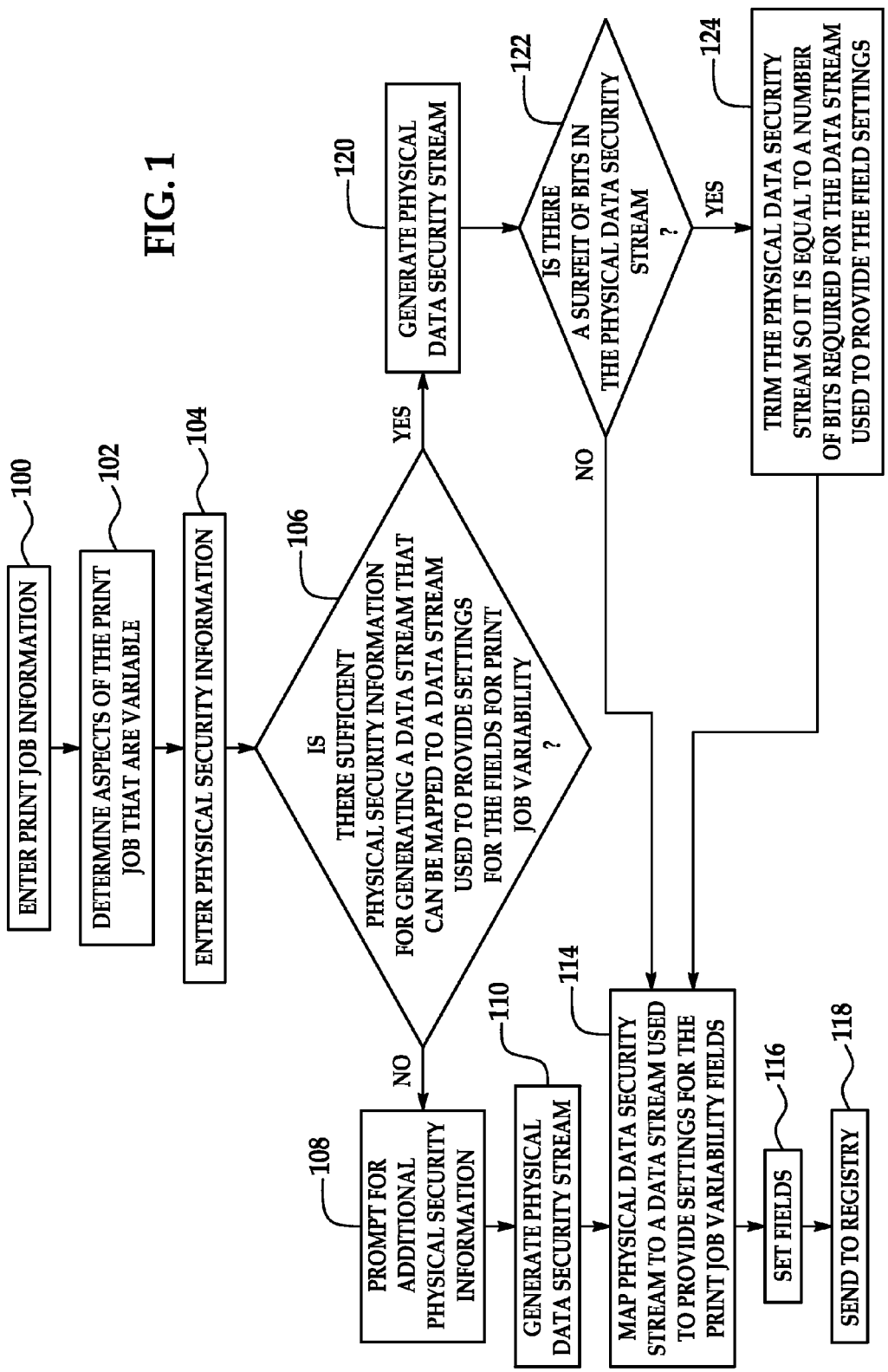
FIG. 1 is a flow diagram depicting an embodiment of the method for enhancing security printing.

Referring now to FIG. 1, an embodiment of the method for enhancing security printing is disclosed. The method(s) disclosed herein are generally carried out utilizing a system including means for performing each of the steps. In one non-limiting example, the system includes a computer or enterprise computing system and programs or software configured to receive data, generate data streams, map multiple data streams, and set variable print job aspects based upon the mapped data streams. As used herein, the term "enterprise computing system" means a network of interconnected computers, including virtualized and/or redundant processors, banks of processors and/or servers, etc. It is to be understood that the components of the system may be implemented in a consolidated location, or portion(s) of the system may be implemented at different locations.

The hardware of such a system includes an electronic processing device, such as, for example, a controller, a micro controller, a microprocessor, a host processor, and/or an application specific integrated circuit (ASIC). It is to be understood that the electronic processing device may be a processor working in conjunction with a central processing unit (CPU) performing the function of a general-purpose processor.

Computer program(s) and/or software (e.g., computer readable code) may be loaded onto the computer or enterprise computing system, and stored in a memory thereof. Such programs and/or software are executable via the processing device. Examples of such programs(s) and/or software include those configured to generate data streams, those which map multiple data streams, those configured to scramble/encode/encrypt data, and those configured to perform or provide any other desirable service/function.

The system may also include one or more algorithms that are executable via the electronic processing device. Such algorithms are incorporated into the computer or enterprise computing system and/or into the software. Generally, information is interpreted and written to a data stream, and/or mapped to another data stream by one or more of the algorithms.

As shown at reference numeral 100 of FIG. 1, security print job information is entered into the system (not shown) by an authorized system operator. Print jobs are, by definition, variable. As such, the output of the print job information entry step is the determination of the aspects of the print job that are variable, as shown at reference numeral 102.

One or more aspects of the print job that are variable are collectively referred to as print job variability fields (PJVF). It is to be understood that any aspect of the print job that imposes variability is a PJVF. Non-limiting examples of print job variability fields include the type of deterrent used, deterrent generation, deterrent hybridization (e.g., the means by which to chain, or link, multiple deterrents together), serialization, deterrent scrambling techniques, logging techniques (e.g., field arrangement, fields included, signatures used, etc.), inspection plan(s), authentication plan(s), recall plan(s), connections between two or more printed regions, the number of bits of data to print in a predetermined region, and at least one of hashing, encoding, or encrypting techniques. It is to be understood that a single print job may include any one of, or any combination of the listed variable print job aspects. It is to be further understood that the information (i.e., payload) that is embedded in the security deterrents themselves is generally not considered to be variable.

Physical security information is also entered into the system, as shown at reference numeral 104. Generally, the system operator enters such information as part of the authorization process of such operator. The authorization process may include one or more questions geared toward verifying that a person attempting to use the system is authorized to do so. The user is prompted directly for the salient security information, such as, for example username, password, authorization code, biometric information, challenge response(s), or combinations thereof.

Other physical security information includes appropriate machine information or device (i.e., possession) information. A non-limiting example of such information is any GUID or UUID for the device, smart card, etc. Such information is automatically entered as part of the system. As proof of identity, machine-derived information can also be entered to fill the list of fields to a desired level (e.g., using a hash of the machine UUID as the seed of a random number generator and a hash of the user information as the offset).

It is to be understood that the physical security information may be entered prior to or subsequent to the entry of the print job information and the determination of the variable aspects of that print job.

The system then utilizes the physical security information to create a physical security data stream (PSDS) that is used as the bit stream to set the print job variability fields. Any fields that are recognized or reported by the system as being variable are taken into consideration when generating the physical security data stream. It is to be understood, however, that the operator's intent up to and including the user interface-based layout of the print job (or a hash thereof) may be used to encode data in the security job. For example, if the operator manually decides on any of the PJVFs, then these features are no longer considered when creating the physical security data stream. The user interface (UI) system could be used to define one or more of the example PJVFs set forth hereinabove. If all variable aspects of the print job are specified by the operator, then the system described herein would degenerate to an entirely manually specified system. In such instances, the print job has no variability. As such, the PSDS would be non-empty but the PJVF would be an empty set. In this case, the PSDS would not be mapped to the PJVFs, but instead may be associated with the print job in a registry or may be added to the print job without the operator's knowledge (e.g., as steganographic information, including, but not limited to a watermark, pixel manipulations, etc.).

Prior to creating the physical security data stream, the system checks if there is a sufficient amount of physical information to generate a physical security data stream that can be mapped to a data stream used to provide the settings for the PJVFs, as shown at reference numeral 106. In other words, the system verifies that the physical security data stream generated from the physical security information is sufficient to fill the specified (unfilled) print job variability fields.

If the physical security information is not enough to generate a suitable physical security data stream, the security information may be circularly appended to achieve the desirable physical security data stream. As a non-limiting example, if the security bits include "ABCDEFG", and the print variability requires ten chunks, the system may generate "ABCDEFGABC" as the circular stream.

In another example, when the physical security information is not enough to generate a suitable physical security data stream, the operator may be prompted for additional security information, as shown at reference numeral 108. Non-limiting examples of such additional security information include topical information, biometric information, machine identification information, possession information, operator-input information, or combinations thereof. Operator-input information generally includes response(s) from the operator to an interrogation pertaining to something random that is presumably easy to answer (e.g., the current weather, the day of the week, etc.).

Once the original and additional physical security information is enough to generate a desirable physical data security stream, this stream is generated based upon such information, as shown at reference numeral 110. It is to be understood that encryption, encoding, scrambling, hashing, or combinations thereof may also be performed at this point. The physical security data stream is mapped to the data stream used to provide settings for the print job variability fields, as shown at reference numeral 112. This PSDS is the length of the PJVF, and so the bits from the PSDS are used to fill the PJVFs. Once the data streams are mapped, the fields are set based upon the mapping (reference numeral 116), and the entire print job (including the settings) is sent to a registry (reference numeral 118).

The registry is generally a secure storage system for security campaigns. The registry may be a secured server or some other type of registry. If the registry is secure, the print job and settings may be transmitted to the registry in plaintext. It is to be understood that the print job records that are stored at the registry may be accessed and utilized at any time by one or more authorized persons (e.g., the owner of the print job, the security printer, etc.).

As shown at reference numeral 120, if the physical security information is enough to generate a suitable physical security data stream, the system continues with generating the physical security data stream based upon the originally input physical security information. The system will also check if the generated data stream has a surfeit of bits (see reference numeral 122). When a surfeit of bits is present, the generated physical security stream is longer than the number of bits required to fill all of the PJVFs.

If the generated physical security data stream is not too long, the method continues with mapping the physical data security stream to the data stream used to provide settings for the print job variability fields (reference numeral 114), setting the fields based on the mapping (reference numeral 116), and sending the print job to a registry (reference numeral 118).

If, however, the generated physical security data stream is too long, it may be trimmed so that the number of bits in the trimmed data stream is equal to the number of bits required for the PJVFs, as shown at reference numeral 124. Trimming the generated physical security data stream may be accomplished via hashing, cropping, sampling, or combinations thereof. When sampling is used to trim, bits are dropped in a periodic or repeated fashion. For example, every N'th character may be deleted, where N is any desirable integer.

Once the generated physical security data stream is trimmed to a suitable bit length, the method continues with mapping the physical data security stream to the data stream used to provide settings for the print job variability fields (reference numeral 114), setting the fields based on the mapping (reference numeral 116), and sending the print job to a registry (reference numeral 118).

The following is a non-limiting example of an embodiment of the method disclosed herein. The user inputs his/her username, password, and the date and time at which he/she is logging on. The username and password are each truncated/padded to 8×6=48 bits (8 characters with 64 options each), and the Year.Date.Time equals 16+9+27=52 bits (e.g., 16 bits for the year, 9 bits for one of 365 days, and 27 bits for one of 1000×86400 milliseconds in a day). The machine ID may equal 32 bits. This yields 180 bits. In this non-limiting example, the print job security fields include deterrent generation and hybridization. A fixed set of deterrents and logging plan is set forth below, in which the bits from the physical security data stream are mapped to the security fields:

Deterrent 1: 32 bits for "seed" of the deterrent (seed determines how the sequential elements in this deterrent are generated);

Deterrent 2: 64 bits for "seed" of the deterrent (seed determines how the sequential elements in this deterrent are generated);

Mapping of Deterrent 1 to Deterrent 2: 32 bits (these bits are used to scramble the sequence in Deterrent 1 to use as an offset for the sequential elements in Deterrent 2); and Mapping of Deterrents 1 and 2 to Deterrent 3 (52 bits, with first 12 bits repeated/appended at end to use as 64-bit "seed" to Deterrent 3).

It is to be understood that the physical security data stream that is mapped to the data stream for the print job variability field settings may be encrypted, encoded or scrambled in any desirable manner. The encryption, encoding or scrambling may be accomplished at any time prior to mapping the data streams. In one embodiment, encryption is based on an authorized user's private key.

Once the print job variability fields are set utilizing the method(s) disclosed herein, the print job may be sent to a printer to be written on an object. It is to be understood that the term "object" as used herein is to be interpreted broadly and may include, but is not limited to, any type of object, product, document or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, bottles, vials, dispensers, inserts, other documents, or the like, or combinations thereof.

Figure 2:
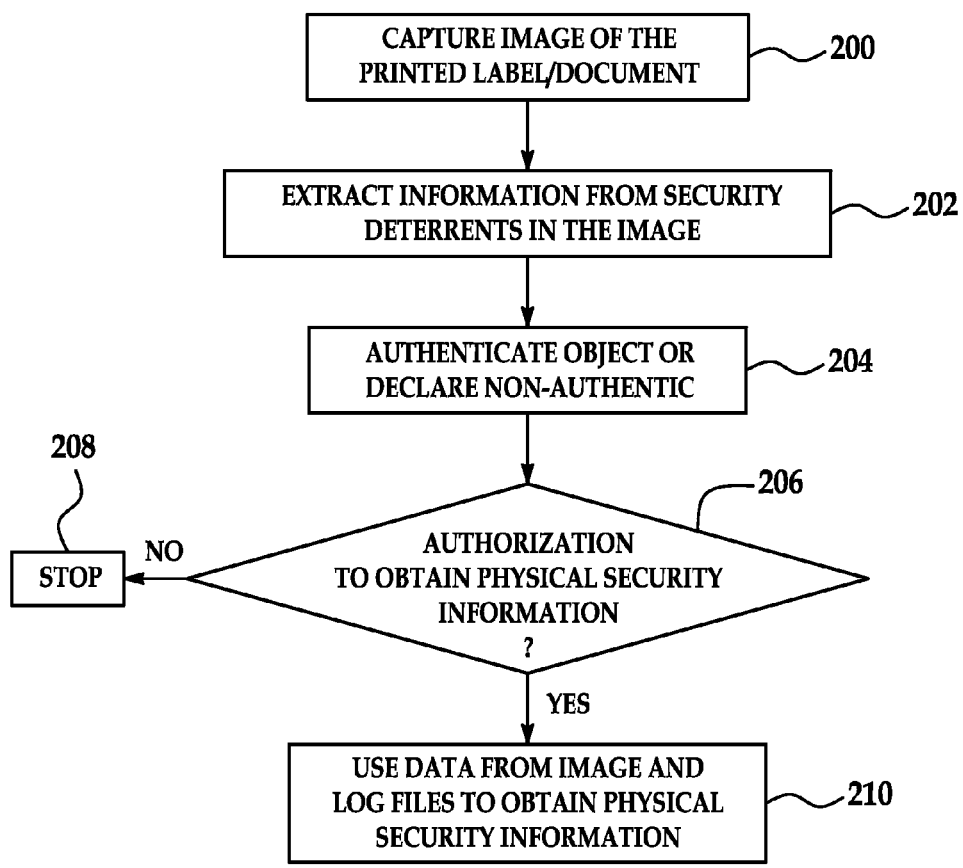
FIG. 2 is a flow diagram depicting an embodiment of the method post-printing.

Referring now to FIG. 2, an embodiment of the method post-printing is depicted. An object including a label (or other printed item) is deployed. In some instances, the label is generated via the print job disclosed herein. When object authentication is desired, an image of at least the label is captured, as shown at reference numeral 200. The captured image is generally in digital format, and is collected using an electronic device. The electronic device may be a digital camera. It is to be understood that the digital camera may be embodied in, for example, a cellular phone, a personal digital assistant, or the like. Another suitable electronic device is a scanner, an inspection camera, a tabletop imager, or the like.

The digital image of the object is then transmitted from the electronic device to any processing unit with an associated program memory and an analysis code loaded into the program memory, where all information is extracted from the security deterrents in the image, as shown at reference numeral 202. If applicable, such information is decoded, decrypted and/or unscrambled, and then may be associated with the registry. Once the security deterrents and the information contained therein are analyzed, the object may be declared authentic or non-authentic (as shown at reference numeral 204), depending on whether the extracted information matches the original embedded data (which may be retrieved from the registry). If the security information in the deterrents is accurate, the object may be declared authentic.

As an additional level of authentication and as shown at reference numeral 206, it may be determined whether the end user is authorized to obtain the physical security information associated with the image. A user may be authorized when entered biometrics match embedded biometrics, entered password(s) match saved password(s), etc.

As shown at reference numeral 208, when the end user is not authorized to obtain the physical security information, the authentication process ends.

When the end user is authorized to obtain the physical security information, the logged file(s) that is/are associated with the print job may be obtained from the registry. The information in the file(s) (i.e., how the PSDS and PJVF were mapped) and the extracted data from the image may be used to re-populate the PJVFs. This repopulation provides the PSDS and the physical security information utilized to generate the PSDS. Any image data that is consistent with the PJVFs will provide a pathway to discerning the PSDS information. Non-legitimate images, however, will not afford access to the physical security information.

In some instances, it may be desirable to release a portion of the PSDS-PJVF mapping to allow partial authentication. In such instances, the portion of the mapping that is not released may be kept in reserve, for example, for recall purposes. As a non-limiting example, if the first 50% of the PSDS dictates the chaining between half of the deterrents, the other 50% can be kept in reserve to be used in cases of product recall, deeper authentication, etc.

Clause 1: A method for enhancing security printing, the method comprising:
determining fields associated with print job variability;
entering physical security information;
generating a physical security data stream from the physical security information;
mapping the physical security data stream to a data stream used to provide settings for the fields for the print job variability; and
setting the fields for the print job variability based upon the mapping of the physical security data stream.

Clause 2: The method as defined in clause 1 wherein the fields associated with the print job variability are selected from type of deterrent, deterrent generation, deterrent hybridization, serialization, deterrent scrambling techniques, logging techniques, inspection plan, authentication plan, recall plan, connections between two or more printed regions, number of bits of data to print in a predetermined region, and at least one of hashing, encoding, or encrypting techniques.

Clause 3: The method as defined in any of the preceding clauses wherein prior to generating the physical security data stream, the method further comprises determining whether there is sufficient physical security information for generating the physical security data stream such that the generated physical security data stream can be mapped to the data stream used to provide the settings for the fields.

Clause 4: The method as defined in clause 3 wherein the physical security information is not sufficient to generate the physical security data stream, and wherein the method further comprises circularly appending the physical security information to generate the physical security data stream that can be mapped to the data stream used to provide the settings for the fields.

Clause 5: The method as defined in any of clauses 3 or 4 wherein the physical security information is not sufficient to generate the physical security data stream such that the generated physical security data stream can be mapped to the data stream used to provide the settings for the fields, and wherein the method further comprises:
prompting for additional physical security information selected from topical information, biometric information, machine identification information, possession information, operator-input information, or combinations thereof; and
generating the physical security data stream based upon the physical security information and the additional physical security information.

Clause 6: The method as defined in clause 3 wherein when the physical security information is sufficient to generate the physical security data stream such that the generated physical security data stream can be mapped to the data stream used to provide the settings for the fields, the method further comprises determining if there is a surfeit of bits in the physical security data stream.

Clause 7: The method as defined in clause 6 wherein when there is a surfeit of bits in the physical security data stream, the method further comprises trimming the physical security data stream such that the trimmed physical security data stream is equal to a number of bits required for the data stream used to provide the settings for the fields.

Clause 8: The method as defined in clause 7 wherein trimming the physical security data stream is accomplished via hashing, cropping, sampling, or combinations thereof.

Clause 9: The method as defined in clause 7, further comprising encrypting, encoding, or scrambling the physical security data stream, and wherein trimming is accomplished before or after such encrypting, encoding, or scrambling.

Clause 10: The method as defined in clause 6 wherein when there is not a surfeit of bits in the physical security data stream, the method further comprises transmitting the set fields for the print job variability to a registry.

Clause 11: The method as defined in any of the preceding clauses, further comprising transmitting the set fields for the print job variability to a registry.

Clause 12: The method as defined in any of the preceding clauses, further comprising:
deploying an object having a printed label, including at least one security deterrent, printed thereon;
capturing an image of the at least one security deterrent on the object; and
decrypting, decoding, or descrambling the at least one security deterrent.

Clause 13: The method as defined in clause 12, further comprising:
obtaining a log that outlines the mapping of the physical security data stream to the data stream used to provide the settings for the fields;
comparing the mapping in the log to settings of the printed label on the object; and
from the comparison, determining whether the object is authentic.

While several embodiments have been described in detail, it will be apparent to those skilled in the art that the disclosed embodiments may be modified. Therefore, the foregoing description is to be considered exemplary rather than limiting.

What is claimed is:

1. A method for enhancing security printing, the method comprising:
   determining fields associated with print job variability;
   entering physical security information;
   determining, by a processor, whether the physical security information is sufficient to generate a physical security data stream such that the generated physical security data stream can be mapped to a data stream used to provide settings for the fields for the print job variability;
   when the physical security information is sufficient to generate the physical security data stream, generating the physical security data stream from the physical security information;
   mapping the physical security data stream to the data stream used to provide settings for the fields for the print job variability; and
   setting the fields for the print job variability based upon the mapping of the physical security data stream.

2. The method as defined in claim 1 wherein the fields associated with the print job variability are selected from type of deterrent, deterrent generation, deterrent hybridization, serialization, deterrent scrambling techniques, logging techniques, inspection plan, authentication plan, recall plan, connections between two or more printed regions, number of bits of data to print in a predetermined region, and at least one of hashing, encoding, or encrypting techniques.

3. The method as defined in claim 1, further comprising transmitting the set fields for the print job variability to a registry.

4. The method as defined in claim 1, further comprising:
   when the physical security information is not sufficient to generate the physical security data stream, adding additional information to the physical security information to generate the physical security data stream that can be mapped to the data stream used to provide the settings for the fields.

5. The method as defined in claim 1, further comprising:
   when the physical security information is not sufficient to generate the physical security data stream, prompting for additional physical security information selected from topical information, biometric information, machine identification information, possession information, operator-input information, or combinations thereof; and
   generating the physical security data stream based upon the physical security information and the additional physical security information.

6. The method as defined in claim 1, further comprising:
   when the physical security information is sufficient to generate the physical security data stream, determining if there is a surfeit of bits in the physical security data stream.

7. The method as defined in claim 6, further comprising:
   when there is a surfeit of bits in the physical security data stream, trimming the physical security data stream such that the trimmed physical security data stream is equal to a number of bits required for the data stream used to provide the settings for the fields.

8. The method as defined in claim 7 wherein trimming the physical security data stream is accomplished via hashing, cropping, sampling, or combinations thereof.

9. The method as defined in claim 7, further comprising encrypting, encoding, or scrambling the physical security data stream, and wherein trimming is accomplished before or after such encrypting, encoding, or scrambling.

10. The method as defined in claim 6, further comprising:
    when there is not a surfeit of bits in the physical security data stream, transmitting the set fields for the print job variability to a registry.

11. The method as defined in claim 1, further comprising:
    deploying an object having a printed label, including at least one security deterrent, printed thereon;
    capturing an image of the at least one security deterrent on the object; and
    decrypting, decoding, or descrambling the at least one security deterrent.

12. The method as defined in claim 11, further comprising:
    obtaining a log that outlines the mapping of the physical security data stream to the data stream used to provide the settings for the fields;
    comparing the mapping in the log to settings of the printed label on the object; and
    from the comparison, determining whether the object is authentic.

13. A method for enhancing security printing, the method comprising:
    entering, into a system, information for a print job;
    determining, via the system, fields of the print job that are variable;
    entering, into the system, physical security information;
    determining, by a processor, whether the physical security information is sufficient to generate a physical security data stream that can be mapped to a data stream used to provide settings for the variable fields;
    generating the physical security data stream from the physical security information;

determining whether there is a surfeit of bits in the physical data security stream;

when there is a surfeit of bits, trimming the physical security data stream so the physical security data stream is equal to a number of bits required for the data stream used to provide settings for the variable fields;

mapping, by a processor, the physical security data stream to the data stream used to provide settings for the variable fields;

setting the variable fields for the print job based upon the mapping of the physical security data stream; and sending the set fields for the print job to a registry.

14. A system for enhancing security printing, comprising:

a processor; and a memory storing machine readable instructions that, when executed by the processor, cause the processor to:

determine fields associated with print job variability;

enter physical security information;

determine whether the physical security information is sufficient to generate a physical security data stream such that the generated physical security data stream can be mapped to a data stream used to provide settings for the fields for the print job variability;

when the physical security information is sufficient to generate the physical security data stream, generate the physical security data stream from the physical security information;

map the physical security data stream to the data stream used to provide settings for the fields for the print job variability; and set the fields for the print job variability based upon the mapping the physical security data stream.

\* \* \* \* \*

UNITED STATES PATENT AND TRADEMARK OFFICE
CERTIFICATE OF CORRECTION

| | | |
|---|---|---|
| PATENT NO. | : 8,593,688 B2 | Page 1 of 1 |
| APPLICATION NO. | : 13/125269 | |
| DATED | : November 26, 2013 | |
| INVENTOR(S) | : Steven J. Simske et al. | |

It is certified that error appears in the above-identified patent and that said Letters Patent is hereby corrected as shown below:

In the Claims

In column 9, line 32, in Claim 14, delete "mapping" and insert -- mapping of --, therefor.

Signed and Sealed this
Twenty-fifth Day of February, 2014

Michelle K. Lee
*Deputy Director of the United States Patent and Trademark Office*